Patented Mar. 7, 1933

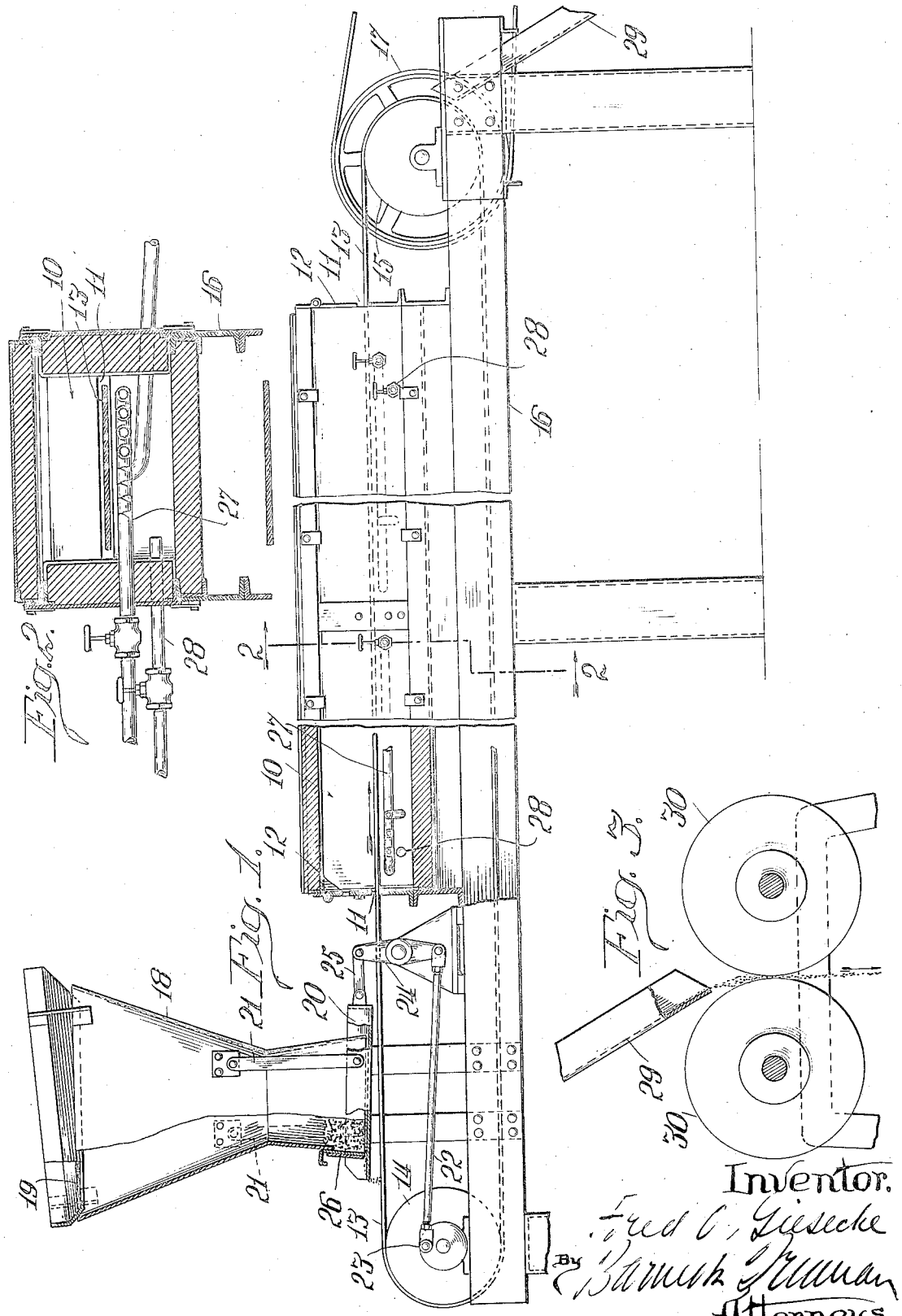

1,899,952

UNITED STATES PATENT OFFICE

FRED O. GIESECKE, OF EVANSTON, ILLINOIS, ASSIGNOR TO INTERNATIONAL PATENTS DEVELOPMENT COMPANY, OF WILMINGTON, DELAWARE, A CORPORATION OF DELAWARE

APPARATUS FOR MAKING GELATINIZED STARCH PRODUCTS

Application filed January 19, 1929. Serial No. 333,659.

This invention relates to the manufacture of gelatinized or partially gelatinized starch products for use as binders or adhesives or sizing and the object of the invention is to provide a novel apparatus for manufacturing products of this type.

The invention is illustrated in the accompanying drawing, in which

Fig. 1 is a fragmentary longitudinal view in elevation, with parts in section, of a preferred form of oven for practicing the invention; and Fig. 2 is a cross sectional view on line 2—2 of Fig. 1; and Fig. 3 is a fragmentary view in elevation with parts in section of a pair of rolls which may be used, if desirable, for completing the treatment of starch.

In carrying out the invention one may use either starch that has been tabled, after being washed in washing filters or without washing; or one may use mill starch, that is starch before it reaches the tabling operation which will contain a considerable quantity of gluten and larger amounts of sulphur dioxide, ash and soluble substances than the tabled and washed starch; or it is possible to use other mixtures of starch and gluten taken at different points from the magmas undergoing treatment for the manufacture of starch from grain by the "wet milling method", containing in some cases small quantities of cellulosic material. The starch should contain from 25% to 50% of water. With this water content the starch is subjected to heat in an atmosphere containing enough moisture so that the water in the starch is prevented from evaporating or at least its evaporation is retarded. The moisture content of the air is in fact controlled (having regard to amount of water in the starch) so as to produce the degree of gelatinization required.

Preferably starch containing about 40% water (60% starch and 40% water) is subjected to a temperature of 280° F. for about ten minutes in an atmosphere saturated with water moisture so that there is substantially no evaporation. A product having like properties may be made by decreasing the temperature (so long as it is above the gelatinizing point of starch, approximately 150° F.) and increasing the time factor; or by using a wetter starch but diminishing the moisture content of the air so that some water will be evaporated; or by using a drier starch and supplying additional steam to the surrounding atmosphere for absorption in the starch, although these alternative methods are not in my judgment as desirable as the first described method. By varying the original water content of the starch and by controlling the moisture content of the atmosphere the degree of gelatinization may be varied. The products made by the preferred method specified will form when wet up with water very adhesive colloidal substances capable of absorbing from 6 to 12 times their weight of water.

Referring now to the drawing, 10 designates a chamber or oven having slits 11, 11 in its end walls 12, 12, for a conveyor belt 13 supported outside the oven on rollers 14, 15 turning in bearings on a framework 16, roller 15 being provided with a driving pulley 17. The starch in moistened condition, as described, is spread out in a layer on the belt by any suitable feeding apparatus. In the drawing a hopper 18 is shown into which the starch is delivered through a screen 19. The hopper has a swinging bottom 20 supported by parallel links 21, 21, and oscillated by a link mechanism from 14, this mechanism consisting of a link 22 connected with a wrist pin 23 on the roller, an oscillating lever 24 and a fixture 25. The front side of the hopper is provided with a slide gate 26 which is adjusted so as to provide a slit, of a width depending upon the thickness of starch layer desired, between its lower edge and the oscillating bottom member 20. When the latter is moved to the left (Fig. 1) a layer of starch is carried out from under the mass in the hopper. On the return movement this layer is pushed off upon the belt 13 and is carried into oven 10. Heat is supplied to the oven in any desired manner. For example, a steam coil 27 may be arranged directly under the belt. Steam may be supplied to the oven in regulated quantities through steam pipes 28, 28.

The material is carried out of the oven by the belt and from there discharged to a chute 29.

The material issuing from the oven being quite hot will give off a considerable portion of its moisture if merely left standing. In order to reduce the moisture content for example to 6% to 10% as may be desired, the material is preferably dried in any suitable form of drier; and in drying it may be subjected to pressure as indicated in Fig. 3. In such case a pair of interiorly steam heated drying rollers 30, 30 may be arranged at the lower end of chute 29 which dry the material and may also bring about further gelatinization of the starch.

It will be understood that the form of apparatus shown in the drawing is only illustrative. Modifications will readily suggest themselves to those skilled in this art and it is the intention to cover by patent all variants within the scope of the appended claims.

The term "starch" when used in the claims without qualification is intended to cover not only the substantially pure table starch, but also the starch and gluten mixtures referred to above. I do not claim herein the method disclosed in my co-pending application Serial No. 328,577, filed December 26, 1928, in which the gelatinization is effected by means of the rollers alone; nor do I claim the herein described products which are claimed in applications filed by me on July 20, 1931, Serial Nos. 552,078, 552,079, and 552,080.

I claim:

1. Apparatus for making gelatinized starch comprising in combination an oven substantially closed so as to retain water vapor, means for introducing the starch in a relatively thin layer into the oven, means for applying heat to the oven and means for introducing water vapor into the oven.

2. Apparatus for making gelatinized starch comprising in combination an oven, a conveyor movable through the oven, means for spreading the starch in a layer on the conveyor so that it will be moved through the oven, means for applying heat to the starch in the oven, and means for introducing water vapor into the atmosphere in the oven.

3. Apparatus for making gelatinized starch comprising in combination an oven substantially closed so as to retain water vapor, means for passing a relatively thin layer of starch therethrough, means for applying heat to the oven and means for introducing water vapor into the oven.

FRED O. GIESECKE.